(12) United States Patent
Schierholt et al.

(10) Patent No.: US 7,778,857 B2
(45) Date of Patent: Aug. 17, 2010

(54) SYSTEM AND METHOD FOR SERVICE PARTS PLANNING IN A MULTI-ECHELON NETWORK

(75) Inventors: Hans Karsten Schierholt, Montreal (CA); Priti Prabhoo, Mountain View, CA (US); Uwe Sodan, Hockenheim (DE)

(73) Assignee: SAP Aktiengesellschaft, Walldorf (DE)

( * ) Notice: Subject to any disclaimer, the term of this patent is extended or adjusted under 35 U.S.C. 154(b) by 1031 days.

(21) Appl. No.: 11/065,393

(22) Filed: Feb. 22, 2005

(65) Prior Publication Data

US 2006/0031084 A1     Feb. 9, 2006

(30) Foreign Application Priority Data

Jul. 20, 2004   (EP) ................... 04103460
Dec. 28, 2004   (EP) ................... 04107030

(51) Int. Cl.
*G05B 19/418*     (2006.01)

(52) U.S. Cl. ............... 705/8; 705/16; 705/22; 705/28

(58) Field of Classification Search ............ 705/8, 705/10, 28
See application file for complete search history.

(56) References Cited

U.S. PATENT DOCUMENTS

| | | | | |
|---|---|---|---|---|
| 5,630,070 A * | 5/1997 | Dietrich et al. | ............... | 705/8 |
| 6,216,109 B1 * | 4/2001 | Zweben et al. | ............... | 705/8 |
| 6,278,978 B1 * | 8/2001 | Andre et al. | ............... | 705/9 |
| 6,560,508 B1 * | 5/2003 | Radican | ............... | 700/214 |
| 6,574,717 B1 * | 6/2003 | Ngai et al. | ............... | 711/147 |
| 6,681,990 B2 * | 1/2004 | Vogler et al. | ............... | 235/385 |
| 6,843,415 B2 * | 1/2005 | Vogler | ............... | 235/385 |
| 6,845,909 B2 * | 1/2005 | Bong et al. | ............... | 235/385 |
| 6,850,809 B1 * | 2/2005 | Callar et al. | ............... | 700/96 |
| 6,866,195 B2 * | 3/2005 | Knowles et al. | ............... | 235/385 |
| 7,043,321 B2 * | 5/2006 | Ruml et al. | ............... | 700/100 |
| 7,047,386 B1 * | 5/2006 | Ngai et al. | ............... | 711/170 |
| 7,055,741 B2 * | 6/2006 | Bong et al. | ............... | 235/382.5 |
| 7,058,587 B1 * | 6/2006 | Horne | ............... | 705/7 |

(Continued)

FOREIGN PATENT DOCUMENTS

JP          2002328984 A    * 11/2002

(Continued)

OTHER PUBLICATIONS

Jim Fulcher. (Feb. 1998). Door-to-door service. Manufacturing Systems, 16(2), 96-102.*

(Continued)

*Primary Examiner*—Romain Jeanty
*Assistant Examiner*—Gurkanwaljit Singh
(74) *Attorney, Agent, or Firm*—Blakely, Sokoloff, Taylor & Zafman LLP

(57) ABSTRACT

Embodiments of the invention are generally directed to a system and method for service parts planning in a multi-echelon network having one or more service parts. For at least a subset of the one or more service parts, a calculation is performed to determine a location within the multi-echelon network at which allocating the service part provides the greatest gain in system availability per item cost. In one embodiment, the calculations take into consideration violations of incremental optimal allocation. In an embodiment, the calculations take into consideration violations of convexity.

20 Claims, 7 Drawing Sheets

U.S. PATENT DOCUMENTS

| | | | |
|---|---|---|---|
| 7,171,376 B2 * | 1/2007 | Ramakrishnan | 705/10 |
| 7,209,869 B1 * | 4/2007 | Kroger et al. | 703/1 |
| 7,210,624 B1 * | 5/2007 | Birjandi et al. | 235/385 |
| 7,536,283 B2 * | 5/2009 | Potter et al. | 703/1 |
| 7,567,543 B2 * | 7/2009 | Cao et al. | 370/338 |
| 7,668,761 B2 * | 2/2010 | Jenkins et al. | 705/28 |
| 2001/0001896 A1 * | 5/2001 | Nonaka et al. | 29/740 |
| 2002/0065764 A1 * | 5/2002 | Brodersen et al. | 705/37 |
| 2002/0116281 A1 * | 8/2002 | Costello et al. | 705/26 |
| 2002/0138316 A1 * | 9/2002 | Katz et al. | 705/7 |
| 2002/0161725 A1 * | 10/2002 | Hoshi | 705/77 |
| 2002/0165782 A1 * | 11/2002 | Falkenstein et al. | 705/22 |
| 2002/0174000 A1 * | 11/2002 | Katz et al. | 705/7 |
| 2003/0033179 A1 * | 2/2003 | Katz et al. | 705/7 |
| 2003/0061088 A1 * | 3/2003 | Sarlay et al. | 705/9 |
| 2003/0105684 A1 * | 6/2003 | Dunn et al. | 705/28 |
| 2003/0158769 A1 * | 8/2003 | Uno et al. | 705/8 |
| 2004/0030611 A1 * | 2/2004 | Byrne | 705/26 |
| 2004/0084526 A1 * | 5/2004 | Knowles et al. | 235/385 |
| 2004/0084527 A1 * | 5/2004 | Bong et al. | 235/385 |
| 2004/0158508 A1 * | 8/2004 | Uehara et al. | 705/28 |
| 2004/0210489 A1 * | 10/2004 | Jackson et al. | 705/22 |
| 2005/0060270 A1 * | 3/2005 | Ramakrishnan | 705/400 |
| 2005/0103842 A1 * | 5/2005 | Bong et al. | 235/385 |
| 2005/0177467 A1 * | 8/2005 | Wang et al. | 705/28 |
| 2007/0100881 A1 * | 5/2007 | McDonald et al. | 707/104.1 |
| 2007/0185760 A1 * | 8/2007 | Birjandi et al. | 705/10 |
| 2007/0185786 A1 * | 8/2007 | Ettl et al. | 705/28 |
| 2007/0282618 A1 * | 12/2007 | Barahona et al. | 705/1 |
| 2008/0040185 A1 * | 2/2008 | Birjandi et al. | 705/8 |

FOREIGN PATENT DOCUMENTS

WO    WO 02/091260 A1 * 11/2002

OTHER PUBLICATIONS

Inventory imbalance Barbara Jorgensen Electronic Business; Jul. 2000; 26, 7; ABI/INFORM Global p. 92.*

Stremler, David Jay (2001). Constraint-based supply chain inventory deployment strategies. M.S.I.E. dissertation, Mississippi State University, United States—Mississippi.*

A Sleptchenko, M C van der Heijden, & A van Harten. (2003). Trade-off between inventory and repair capacity in spare part networks. The Journal of the Operational Research Society, 54(3), 263-272.*

An inventory-theoretic approach to product assortment and shelf-space allocation Timothy L Urban Journal of Retailing; Spring 1998; 74, 1; ABI/INFORM Global p. 15.*

Masters, James M. (1993). Determination of near optimal stock levels for multi-echelon distribution inventories. Journal of Business Logistics, 14(2), 165.*

"Competition in Multiechelon Assembly Supply Chains" Scott M Carr, Uday S Karmarkar. Management Science. Linthicum: Jan. 2005. vol. 51, Iss. 1; p. 45 (15 pages).*

"Evaluation of divergent N-echelon (s,nQ)-policies under compound renewal demand" Gudrun P. Kiesmüller, Ton G. de Kok, Sanne R. Smits, Peter J. M. van Laarhoven. OR Spectrum. Heidelberg: Oct. 2004. vol. 26, Iss. 4; p. 547.*

Alain Martel. (2003). Policies for multi-echelon supply: DRP systems with probabilistic time-varying demands1. INFOR, 41(1), 71-91.*

Athikomrattanakul, Pongchai (2002). Pull-based supply chain allocation for multi-product in multi-echelon distribution system. Ph.D. dissertation, Iowa State University, United States—Iowa.*

Nicholson, Lawrence A. (2000). A multiechelon inventory approach for a distribution system in the health care industry. Ph.D. dissertation, University of Florida, United States—Florida.*

"Efficient inventory management in multi-echelon distribution systems" Yeong-joon Yoo, Won-seok Kim and Jong-tae Rhee, Computers & Industrial Engineering vol. 33, Issues 3-4, Dec. 1997, pp. 729-732.*

Chen, Fangruo (1993). Multi-echelon stochastic inventory systems with centralized stock information. Ph.D. dissertation, University of Pennsylvania, United States—Pennsylvania.*

"Integrating Current End-Item Inventory Conditions into Optimization-Based Long-Run Aggregate Production and Distribution Planning" Miller, Tan C.. Production and Inventory Management Journal. Alexandria: Fourth Quarter 1991. vol. 32, Iss. 4; p. 74 (7 pages).*

"A Network Decomposition Approach for Approximating the Steady-State Behavior of Markovian Multi-Echelon Reparable Item Inventory Systems" Gross, Donald, Kioussis, Leonidas C., Miller, Douglas R.. Management Science. Linthicum: Nov. 1987. vol. 33, Iss. 11; p. 1453 (16 pages).*

* cited by examiner

US 7,778,857 B2

SYSTEM AND METHOD FOR SERVICE PARTS PLANNING IN A MULTI-ECHELON NETWORK

TECHNICAL FIELD

Embodiments of the invention generally relate to the field of materials management and, more particularly, to a system and method for service parts planning in a multi-echelon network.

BACKGROUND

In many cases, repairable parts that are part of a larger system or machine are not disposed of after they are removed from the system or machine in which they are used. Instead, these "service parts" are, for reasons of cost and time, typically shipped to a repair and refurbishment location and prepared for reuse. The term "repairable part" broadly refers to a part that can be economically restored to a serviceable condition. Typically, a repairable part can be repeatedly rehabilitated to a serviceable condition over a period approximating the life of the system to which it is related. A "service part" is a more generic term which can refer to repairable parts as well as to non-repairable parts (e.g., consumable parts).

The inventory planning for service parts (or, for ease of reference, service parts planning), typically involves, inter alia, balancing the availability of a system against the magnitude of the investment in the service parts for the system. For example, an ample supply of service parts is desirable to maintain continuity in the operations of the system. The capital invested in the service parts, however, is non-revenue generating and perishable if, for example, a service part becomes obsolete.

Service parts planning can be applied to networks having a variety of topologies. These topologies are typically classified based on the number of service parts in the network (e.g., item approach vs. system approach) and the number of hierarchical levels in the network (e.g., single echelon vs. multi-echelon networks). A network having a single type of service part and flat topology is often referred to as a single part single echelon network. A network having a number of different service parts and a two-level hierarchy is called a multipart two-echelon network. A generalized network having an arbitrary number of service parts and an arbitrary number of hierarchical levels is called a multipart multi echelon network.

Conventional service parts planning systems are often directed to single part single echelon networks. These conventional systems, however, do not provide a generalized solution for service parts planning in a multi-echelon network. In addition, these conventional processes do not address certain analytical complexities that arise in multi-echelon networks.

SUMMARY OF THE INVENTION

Embodiments of the invention are generally directed to a system and method for service parts planning in a multi-echelon network having one or more service parts. For at least a subset of the one or more service parts, a calculation is performed to determine a location within the multi-echelon network at which allocating the service part provides the greatest gain in system availability per item cost. In one embodiment, the calculations take into consideration violations of incremental optimal allocation. In an embodiment, the calculations take into consideration violations of convexity.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for service parts planning in a multi-echelon network having one or more service parts. One objective of service parts planning is to optimize the allocation of service parts to locations with respect to an available budget. Optimization may refer to attempting to maximize system availability with a constrained budget or (inversely) to achieving a given target system availability with a minimum budget.

Figure 1:
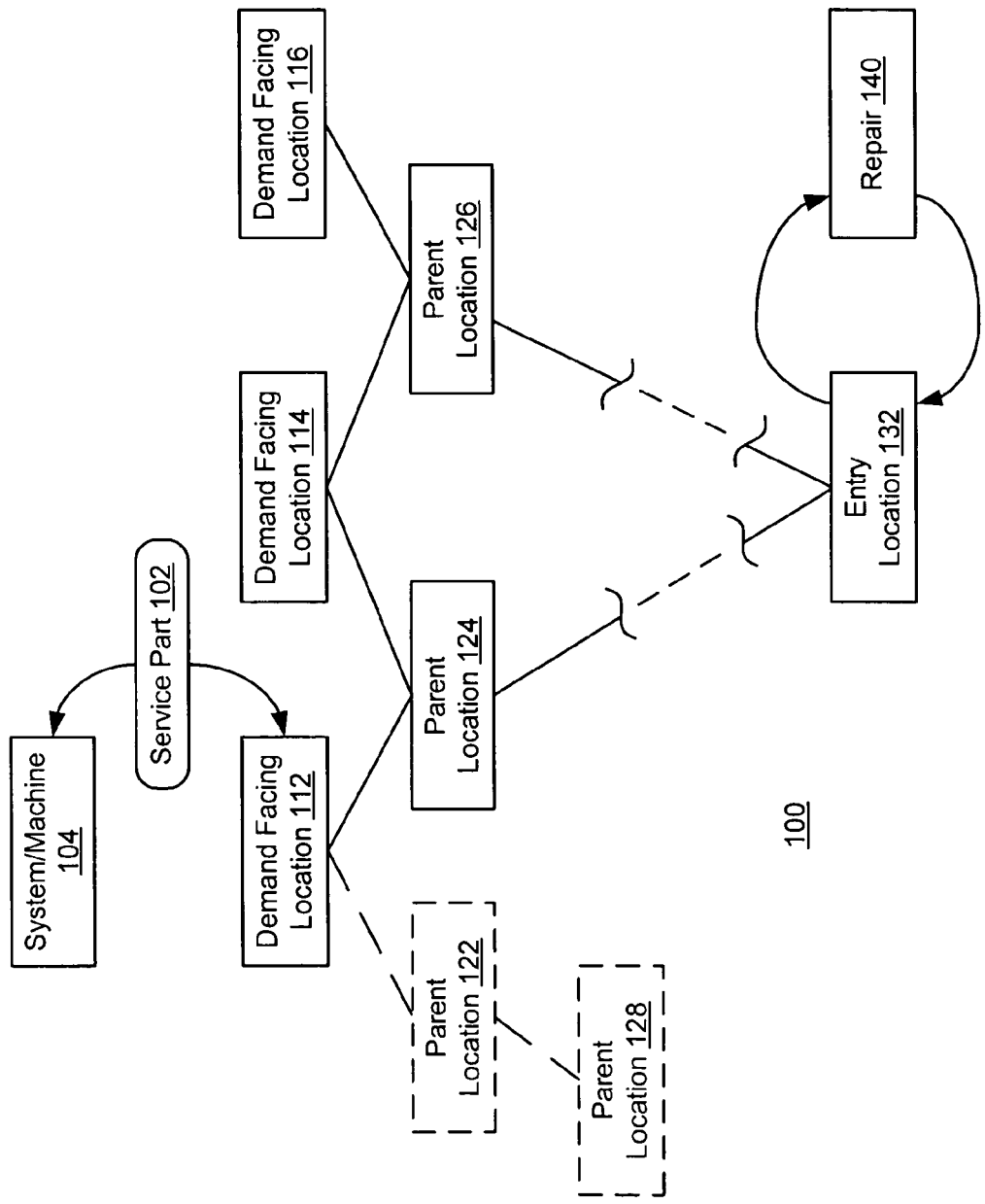
FIG. 1 is a block diagram of selected aspects of a service parts network according to an embodiment of the invention.

FIG. 1 is a block diagram of selected aspects of network 100 according to an embodiment of the invention. Network 100 is a multi-echelon network which includes demand facing locations 112-116, parent locations 122-128, entry location 132, and repair facility 140. The repair facility can also be associated with a non-entry location (e.g., location 126). Network 100 may have an arbitrary number of locations and an arbitrary number of hierarchal levels (e.g., as illustrated by dashed lines in FIG. 1).

A demand facing location is a location that provides service parts to systems or machines as needed (and as available). For example, when service part 102 in system/machine 104 fails, demand facing location 112 provides a serviceable instance of service part 102 to system/machine 104. Typically the defective instance of service part 102 is removed from system/machine 104 and exchanged for a serviceable instance of service part 102 provided by demand facing location 112. The defective instance of service part 102 is (typically) conveyed through the hierarchical levels of network 100 or directly presented to repair facility 140 for refurbishment, maintenance, etc. In the illustrated example, the defective instance of service part 102 may be transferred from demand facing location 112 to parent location 124, and so forth, until it reaches entry location 132. The term "entry location" refers to a location at which one or more service parts may enter network 100 from a supplier. Service Parts may leave the network once they are non-refurbishable.

Selected Processes of an End-to-End Service Parts Management Scenario

Forecasting

The term "forecasting" refers to estimating the demand for one or more service parts within a network (e.g., network 100, shown in FIG. 1). The term "$m_{i,j}$" represents the demand for part i at location j. Demand $m_{i,j}$ can either be given (e.g., for the same time period unit (e.g., weeks, months, etc.) used for lead and repair times) or it can be determined. The determination of demand $m_{i,j}$ may be based, at least in part, on factors such as usage experienced by a service part, the number of base systems within the network, the number of service parts per base system, and the frequency at which the service part is replaced. For example, demand $m_{i,j}$ can be determined in the following way:

(operating hours per time period)*(# of installed base systems)*(# of parts per installed base system)/(mean time between removal).

Similarly, where service part usage is measured in terms of the number of times the service part is used (e.g., the number of flights made by an airplane) demand $m_{i,j}$ can be determined in the following way:

(# of start/land cycles of aircraft per time period)*(# of parts per aircraft)*(failure rate per start/land cycle).

In one embodiment, the start/land cycles refer to the start/land cycles for all aircraft at that location. Alternatively, the average number of start/land cycles per aircraft multiplied by the number of aircraft may be used. In an embodiment, only demand of potential "stocking locations" is considered when forecasting demand. The term "stocking location" refers to a location (e.g., demand facing location 112 and parent location 124) that is expected to hold a service part. Demand for a service part experienced at non-stocking locations is aggregated to the next higher level in the network location hierarchy. That is, demand is aggregated from locations where the part is not allowed to be stored to a stocking location. In one embodiment, demand $m_{i,j}$ is considered constant when it is used in calculations.

Inventory Visibility

The term "inventory visibility" refers to determining the size and distribution of a service parts pool in a network (e.g., network 100, shown in FIG. 1). The term "service parts pool" is a convenient way to collectively refer to the service parts within a location or the entire network. Access to inventory visibility provides a basis for determining whether further investments are necessary to achieve the optimal service level. Inventory visibility includes, for example, determining the serviceable inventory at the different locations, determining the inventory that is in transit to and from repair locations, and determining the inventory in repair facilities.

Distribution Resource Planning/Procurement

In an embodiment, Distribution Resource Planning (DRP) is not driven by the projected (serviceable) inventory at the entry location, which is time-shifted and aggregated throughout the network. The reason for this is that such a policy could (e.g., in the case of unusually large demand for a part) lead to the generation of purchase requisitions, which would unnecessarily increase the size of the service parts pool. In an embodiment, the optimal investment strategy includes a policy of replenishing to locations where repair cannot be preformed and to accept eventual backorders.

In one embodiment, the procurement process is directed to maintaining a target service parts pool size. If a service part is scrapped for some reason and the service parts pool decreases below the target size, then a service part may be procured so that the size of service parts pool is balanced. If, on the other hand, the service parts pool does not decrease below the target size when the service part is scrapped, then procurement of the service part is not triggered.

Replenishment/Deployment

In an embodiment, replenishment is based on the following principle: whenever a service part is used at a location and the unserviceable instance of the service part is not repaired at that location, then the service part is replenished from the next higher echelon in the distribution location hierarchy. Stated more abstractly, whenever the service parts pool assigned to a given location falls below the target pool size for that location, replenishment form the next higher echelon in the distribution location hierarchy is triggered.

In an embodiment, the size and distribution of the service parts pool is recalculated. In response to these recalculations, the service part inventory at one location may be decreased to increase the service part inventory at another location (or a number of other locations). In one embodiment, if this process cannot be implemented within a reasonable time using regular turnover or regular replenishment channels, then a lateral parts movement may be triggered. The term "lateral parts movement" refers to moving service parts among locations that occupy the same hierarchical level within a network.

Delta Planning

The term "delta planning" refers to conducting service parts planning when the budget allocated for service parts within a network has changed. In an embodiment, if a new budget for purchasing new or replacement service parts becomes available, then delta planning may be triggered. In one embodiment, the system-wide number of parts for each service part is minimally constrained to the size of the current service parts pool, during delta planning. In such an embodiment, delta planning allocates the new budget in a way to provide the best increase in service level starting from the current status quo.

Delta planning does not necessarily imply that retired or scraped parts are replaced. Instead, there may be a number of other investments that provide a more beneficial way to allocate the new budget. For example, a change in demand, a change in installed service parts base, or the presence of a currently non-optimal mix of service parts might suggest that it could be more beneficial to allocate the new budget to other areas.

Parameters and Definitions

A system and method for substantially optimizing service parts planning is provided below with reference to FIGS. 2-7. This description includes reference to a number of parameters and definitions. For ease of reference, these parameters and definitions are provided below.

Parameters

Table 1 provides a list of parameters used in an embodiment of the invention.

TABLE 1

| Parameter | Description |
|---|---|
| $A(S_{i,j})$ | System availability across all locations (averaged). |
| $A_j(S_{i,j})$ | System availability at location j. |
| $S_{i,j}$ | Inventory position (e.g., target stock level) for part i at location j. |
| $\mu_{i,j}$ | Poisson mean for average pipeline of part i at location j. |
| $r_{i,j}$ | Probability of repair of service part i at location j. This probability is 0 if no tools for repair exist at this |

TABLE 1-continued

| Parameter | Description |
| --- | --- |
| | location. The probability is 1 if the part is always repaired (and never, e.g., put out-of-service). |
| $T_{i,j}$ | Repair lead time for part i at location j. |
| $O_{i,j}$ | Transport time for part i at location j from its parent. |
| $m_{i,j}$ | Demand for part i at location j. For demand facing locations, this is facing demand; for parent locations, this is demand forwarded from the child locations. |
| $c_i$ | Investment (cost) for part i. |

System Availability

The term "system availability" refers to the probability that a system consisting of a set of parts is functioning. The system may be a single location, a set of locations, or the entire network. In an embodiment, the system availability across all demand facing locations in a network is calculated using equation 1:

$$A(S_{i,j}) = \frac{\sum_{j=1}^{J} A_j(S_{i,j})}{J}. \tag{1}$$

The term J represents the number of demand facing locations. As illustrated by equation 1, the system availability across all demand locations is the average of system availability values at each location. In an embodiment, the system availability at location j is given by equation 2:

$$A_j(S_{i,j}) = \prod_{i=1}^{I} A_{i,j}(S_{i,j}). \tag{2}$$

As illustrated by equation 2, the availability at location j is given by the product of the availability for each part at location j. For example, if location j has two parts that each have an availability of 50%, then the probability that both parts are available at the same time is 50% of 50% or, more precisely, the product of the availability for each part.

In an embodiment, the system availability of part i at location j is given by equation 3:

$$A_{i,j}(S_{i,j}) = 1 - PBO_{i,j}(S_{i,0}, S_{i,j}) = \sum_{x=0}^{S_i} \frac{(\mu_{i,j})^x}{x!} e^{-\mu_{i,j}}. \tag{3}$$

As shown by equation 3, the system availability of part i at location j is a summed Poisson distribution with mean $\mu_{i,j}$. In an embodiment, $\mu_{i,j}$ is given by equation 4:

$$\mu_{i,j} = m_{i,j}\left[r_{i,j}T_{i,j} + (1 - r_{i,j})\left(O_{i,j} + \frac{EBO(S_{i,0}, \mu_{i,0})}{m_{i,0}}\right)\right]. \tag{4}$$

Location 0 is the parent location of location j. In a two echelon network, location 0 is the entry location. The expected backorders (EBO) for the parent location depend on the stocking strategy of its parent location.

Expected Backorders

The expected backorders provide an indication of how quickly the inventory position at a location can be built up. In an embodiment the expected backorders are given by equation 5:

$$EBO(S_{i,0}, \mu_{i,0}) = \sum_{x=S_{i,0}+1}^{\infty} (x - S_{i,0})\frac{(\mu_{i,0})^x}{x!} e^{-\mu_{i,0}}. \tag{5}$$

As shown by equation 5, the expected backorders at a parent location are the weighted sum of the probabilities of x backorders at the next higher location in the location hierarchy. In a two echelon hierarchy, location 0 is the entry location. In a network having more than two echelons, location 0 may be an intermediate location.

Pipeline Calculation

The pipeline for a parent location is calculated to be the sum of the demand rolled up from the child locations minus the probability that a service part can be repaired at a child location. In an embodiment, the pipeline is calculated using equation 6:

$$\mu_{i,0} = \sum_{j=1}^{J} m_{i,j}(1 - r_{i,j}). \tag{6}$$

The "$1-r_{i,j}$" term illustrates that only the demand for service parts that cannot be repaired at the child location(s) is rolled up to the parent location.

Cost Function

In an embodiment, the value of the investment made in a service parts pool is calculated according to equation 7:

$$C = \sum_{i=1}^{I} c_i \sum_{j=0}^{J} S_{i,j}. \tag{7}$$

As shown by equation 7, the total investment in a service parts pool is the sum of the value of the individual service parts across all of the locations in the network.

Optimization Function

The optimization of the investment in a service parts pool can have two inverse objectives. The objective can be to achieve the maximum system availability with a constrained budget. Inversely, the objective can be to achieve a target system availability with a minimum budget. In either case, the allocation of budget to service parts and the allocation of a service part among the potential stocking locations in a network are optimized. In an embodiment, the inverse definitions for the optimization function are given by equations 8a and 8b:

Minimize $C | A \geq A_{min}$ (8a); or

Maximize $A | C \leq C_{max}$ (8b).

Service Parts Planning Procedure

In an embodiment, the generalized procedure for the multipart multi-echelon case is informed by the procedures for more specific cases. Selected aspects of the procedures for certain specific cases are introduced below. These procedures provide a foundation for the generalized procedure described below with reference to FIGS. 2-6.

Single-Part, Single Echelon Procedure

In an embodiment, the system availability of a part in a single echelon network is given by equation 3. Since the Poisson distribution function is steadily increasing, the optimal investment can be determined by increasing S until the maximum budget is reached or until the minimum service level is reached (see, e.g., equations 8a and 8b). In the single-part, single echelon case, equation 4 is reduced to: $\mu_{i,j} = m_{i,j} T_{i,j}$.

Multipart, Single Echelon Procedure

In an embodiment, the system availability for an arbitrary number of service parts when considered at a location is given by equation 2. The distribution of the given budget among the service parts is determined using marginal analysis. Marginal analysis refers to an incremental approach that starts with a minimum $S_{i,j}$ for each service part. Selecting a service part in which to invest is based, at least in part, on which investment yields the greatest gain in system availability per incremental dollar (or other unit of currency) invested. In one embodiment, the marginal analysis includes an assumption that for each service part the gain in system availability decreases with each additional investment in that service part. This precondition is valid (mathematically) if $S_{i,j} > (\mu_{i,j} - 2)$. In an embodiment, this value for $S_{i,j}$ is set as the minimum level for $S_{i,j}$ when performing marginal analysis.

Single-Part, Two-Echelon Procedure

The system availability across all demand facing (child) locations is determined according to equation 1. The various locations (e.g., child locations or parent location) "compete" to determine which location provides the best gain in overall system availability. In an embodiment, the "competition" is implemented in an incremental approach using marginal analysis. While an investment (e.g., increasing $S_{i,j}$) in a demand facing location affects the system availability of this location, this is not the case for an investment in the parent location. The parent location is not considered in the calculation of system availability. It nevertheless indirectly affects system availability by increasing the availability of each child location through reducing the expected backorders in the network-internal distribution (see, e.g., equation 5).

The contribution to the system availability of an investment in a demand facing location is directly computable as the change in availability of that location divided by the number of child locations. In an embodiment, the contribution to system availability in a parent location is calculated by the sum of the effects on child point availability, divided by the number of child locations. The location that yields the largest contribution to system availability is selected for the investment. These procedural elements are repeated until the minimum service level is reached or the budget is exhausted.

Multipart, Two-Echelon Procedure

The system availability for the service parts for each location is calculated using equation 2. In an embodiment, the distribution of the given budget among the service parts is determined through marginal analysis: In an incremental approach starting with a minimum $S_{i,j}$ for each part, the investment for that part that yields the greatest gain in system availability per incremental dollar invested is increased. A simplification to the marginal analysis recognizes that the increase in system availability per dollar invested can refer to the availability of each single part only and not to the system availability. As total system availability is calculated as the mean of the location system availabilities and not as a multiplication of system-wide part availabilities, calculating the exact optimal investment decision involves frequent recalculation of the system availability at all locations, which is a computationally intensive process. Nevertheless, for part availabilities close to 100% those approaches become approximately equal. This simplification can again lead to decisions which result in investment suggestions slightly below the efficiency frontier (the optimal distribution). This precondition is valid (mathematically) if $S_{i,j} > (\mu_{i,j} - 2)$. In an embodiment, this value for $S_{i,j}$ is set as the minimum level for $S_{i,j}$ when performing marginal analysis.

Multipart, Multi-Echelon Procedure

In an embodiment, the procedures as described for the two-echelon case can be extended to determine the system availability for a part in a higher echelon structure. In such an embodiment, repair probabilities are applied to the intermediate parent locations and the repair lead time at the entry location includes the average transport time from the child location to the repair facility and to the entry location. The allocation procedure in a multi-echelon network becomes increasingly complex. In an embodiment, service parts are again incrementally allocated to the location where they contribute most to system availability. In one embodiment, the multipart multi-echelon procedure includes additional checks to provide a substantially optimal result.

Turning now to FIGS. 2-6, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Figure 2:
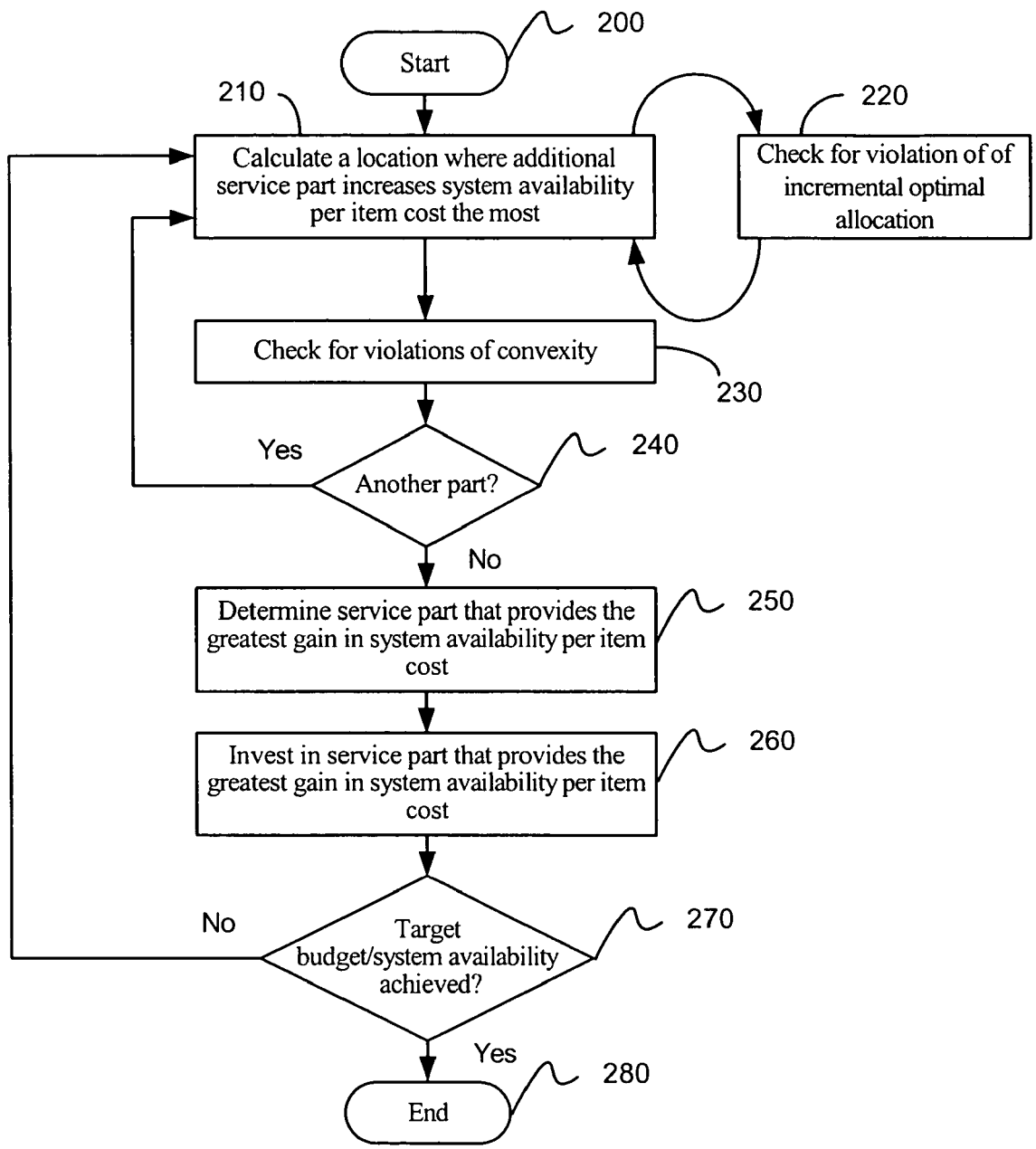
FIG. 2 is a flow diagram illustrating certain aspects of a method for service parts planning in a multi-echelon network, according to an embodiment of the invention.
Figure 3:
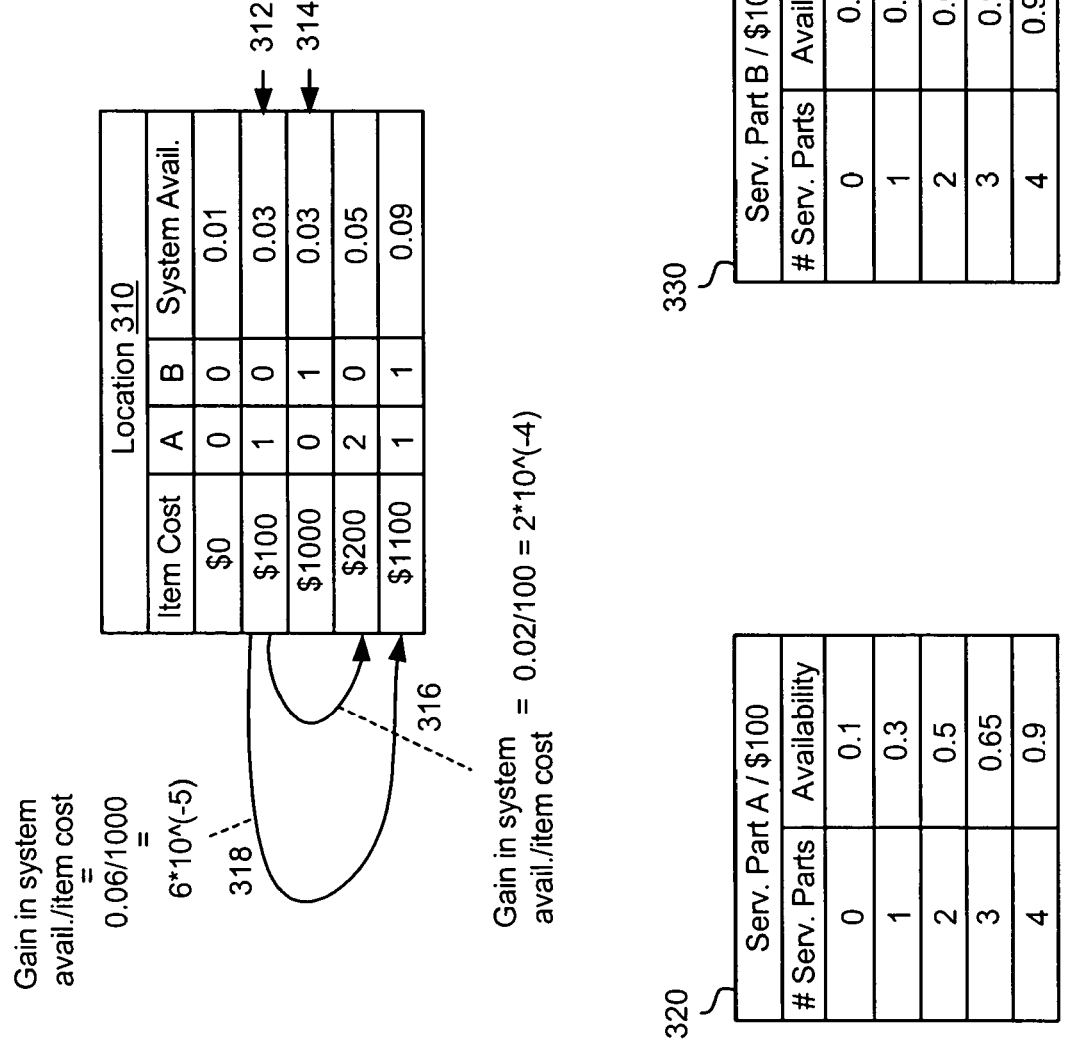
FIG. 3 is a block diagram illustrating the application of marginal analysis to service parts planning, according to an embodiment of the invention.

FIG. 2 is a flow diagram illustrating certain aspects of a method for service parts planning in a multi-echelon network, according to an embodiment of the invention. Referring to process block 210, the location where an additional service part increases system availability the most is determined. In one embodiment, this location is determined based, at least in part, on marginal analysis. FIG. 3 is a block diagram illustrating the application of marginal analysis to service parts planning according to an embodiment of the invention. Location 310 stocks service part A (having a per item cost of $100) and service part B (having a per item cost of $1000). Tables 320 and 330 respectively show system availability as a function of the number of instances for service parts A and B.

Referring to 312, the system availability for location 310 is 0.03 if 1 instance of service part A and 0 instances of service part B are stocked at location 310. Similarly, reference number 314 shows that the system availability for location 310 is 0.03 if 0 instances of service part A and 1 instance of service part B are stocked at location 310. Marginal analysis may be used to determine whether location 310 experiences a greater gain in system availability per item cost if an investment is made in either service part A or service part B. If a second instance of service part A is allocated to location 310 the gain in system availability per item cost is $2*10^{-4}$ as shown by 316. If an instance of service part B is allocated to location 310, the gain in system availability per item cost is $6*10^{-5}$ as shown by 316. Thus, in the illustrated embodiment, a greater gain in system availability per item cost is achieved by investing in service part A.

Figure 4:
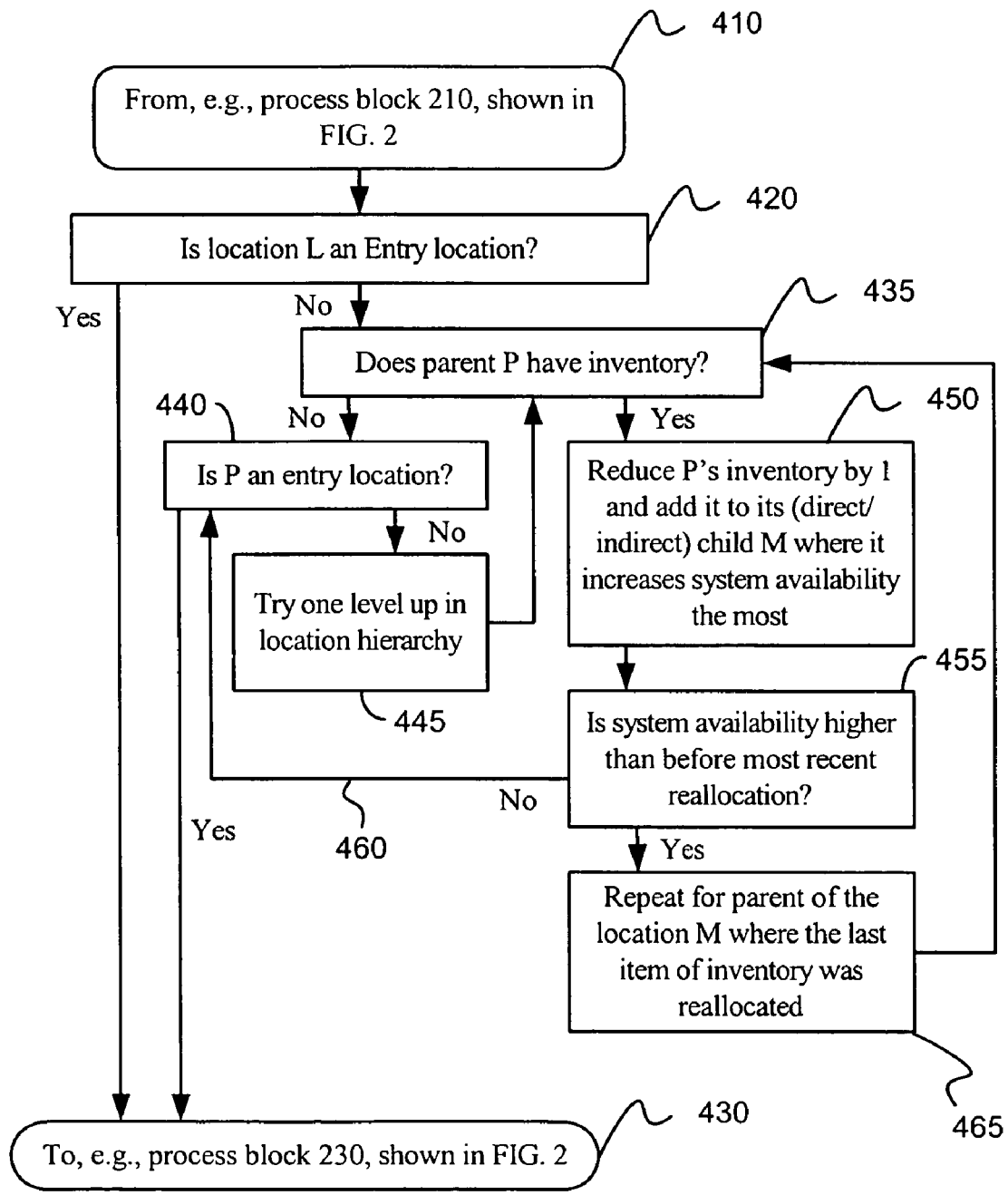
FIG. 4 is a flow diagram illustrating certain aspects of a method for addressing violations of incremental optimal allocation, according to an embodiment of the invention.

In an embodiment, the service parts planning procedure checks for violations of incremental optimal allocation as shown by process block 220. The term "violation of incremental optimal allocation" refers to optimal allocation distributions that involve the combination of (1) increasing the inventory at a location and (2) reallocating a service part (or parts) among two or more locations (e.g., from a parent location to a child location). FIG. 4 is a flow diagram illustrating certain aspects of a method for addressing violations of incremental optimal allocation, according to an embodiment of the invention.

Referring to process block 410, the service parts planning procedure checks for violations of incremental optimal allocation in conjunction with selecting a location at which the allocation of a service part maximally increases system availability per item cost. In one embodiment, these checks are directed to determining whether a higher gain in system availability can be achieved by reallocating a part from the location's parent to a child location providing the largest gain in system availability per item cost. This reallocation may be repeated until the gain in system availability per item cost decreases. Referring to process block 420, the procedure determines whether the location (e.g., as calculated in process block 210, shown in FIG. 2) is an entry location. If the location is an entry location, then it does not have a parent location and the procedure exits as shown by 430.

Referring to process block 435, the procedure determines whether the location's parent has inventory (e.g., has an instance of a service part). If the parent does not have inventory, then the procedure determines whether the parent is an entry location as shown by 440. If the parent is not an entry location, then the procedure is applied to a location that is one level higher in the location hierarchy as shown by 445.

If the parent (or a location selected at, e.g., 445) does have inventory, then the procedure reallocates an instance of the service part from the parent to a child location as shown by 450. In an embodiment, the service part is reallocated to the child that provides the greatest gain in system availability per item cost. The procedure compares the current gain in system availability per item cost to the gain in system availability per item cost prior to the most recent reallocation at 455. If the current gain in system availability per item cost is not greater than it was prior to the most recent reallocation, then the procedure checks a location that is one level higher in the location hierarchy as shown by 460. On the other hand, if the gain in system availability per item cost is greater than it was prior to the most recent reallocation, then the procedure is repeated for the parent of the location where the last item of inventory was reallocated as shown by 465. In an embodiment, this procedure is repeated until the entry location is encountered.

In the multi-echelon environment, the delta in system availability due to an incremental investment in one service part is not necessarily convex. For example, the gain in system availability per item cost may be greater if two (or more) instances of a service part are allocated to a location. Referring again to FIG. 2, in an embodiment, the service parts planning procedure checks for violations of convexity as shown by 230. In one embodiment, checking for violations of convexity includes determining whether the delta in system availability per item cost increases (or decreases) as the inventory position (e.g., 1, 2, 3, etc.) of a service part at a location increases. This procedure can avoid interior points in an otherwise convex investment-system availability curve.

Figure 5:
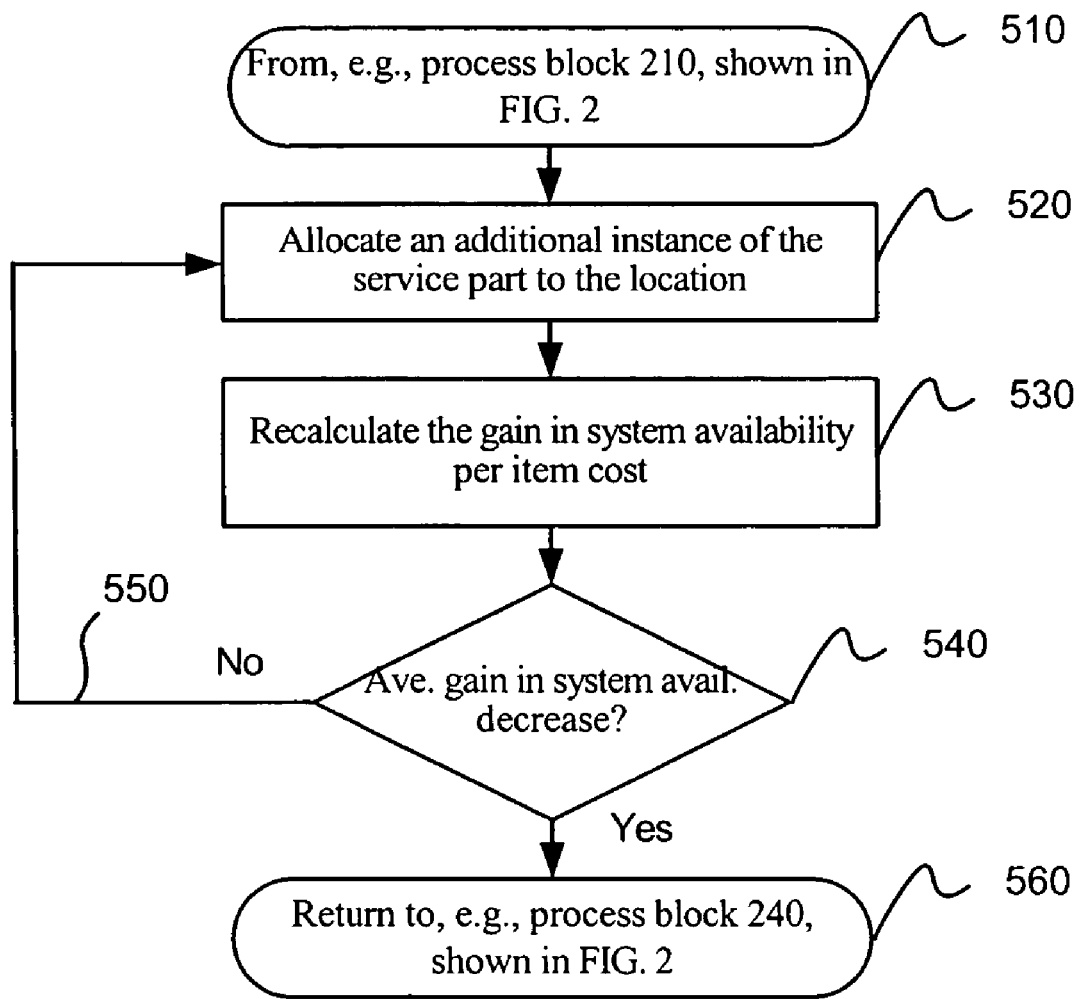
FIG. 5 is a flow diagram illustrating certain aspects of a method for addressing violations of convexity, according to an embodiment of the invention.

FIG. 5 is a flow diagram illustrating certain aspects of a method for addressing violations of convexity, according to an embodiment of the invention. Referring to process block 510, the procedure checks for a violation of convexity after calculating a location where the allocation of a service part provides the greatest gain in system availability per item cost. The procedure allocates an additional instance of the service part to the location at 520. The procedure then recalculates the gain in system availability per item cost based, at least in part, on the current number of instances of the service part at the location. Referring to process block 540, the procedure determines whether the average gain in system availability per item cost decreased after allocating the additional instance of the service part. If the average gain in system availability per item cost has not decreased, then the procedure allocates an additional instance of the service part to the location as shown by 550. In an embodiment, the procedure is repeated until the average gain in system availability decreases as shown by 560.

Referring again to FIG. 2, the procedure for calculating a location where an additional service part maximally increases the system availability per item cost is repeated for each service part in the network as shown by 240. The procedure determines the service part that provides the greatest gain in system availability per item cost at 250. In an embodiment, an investment is made in the service part that provides the greatest gain in system availability per item cost as shown by 260. In one embodiment, the procedure is repeated until either a budget is expended or a target system availability is achieved as shown by 270. Referring to process block 280, the service parts planning procedure ends after the budget is expended or the target system availability is achieved.

Figure 6:
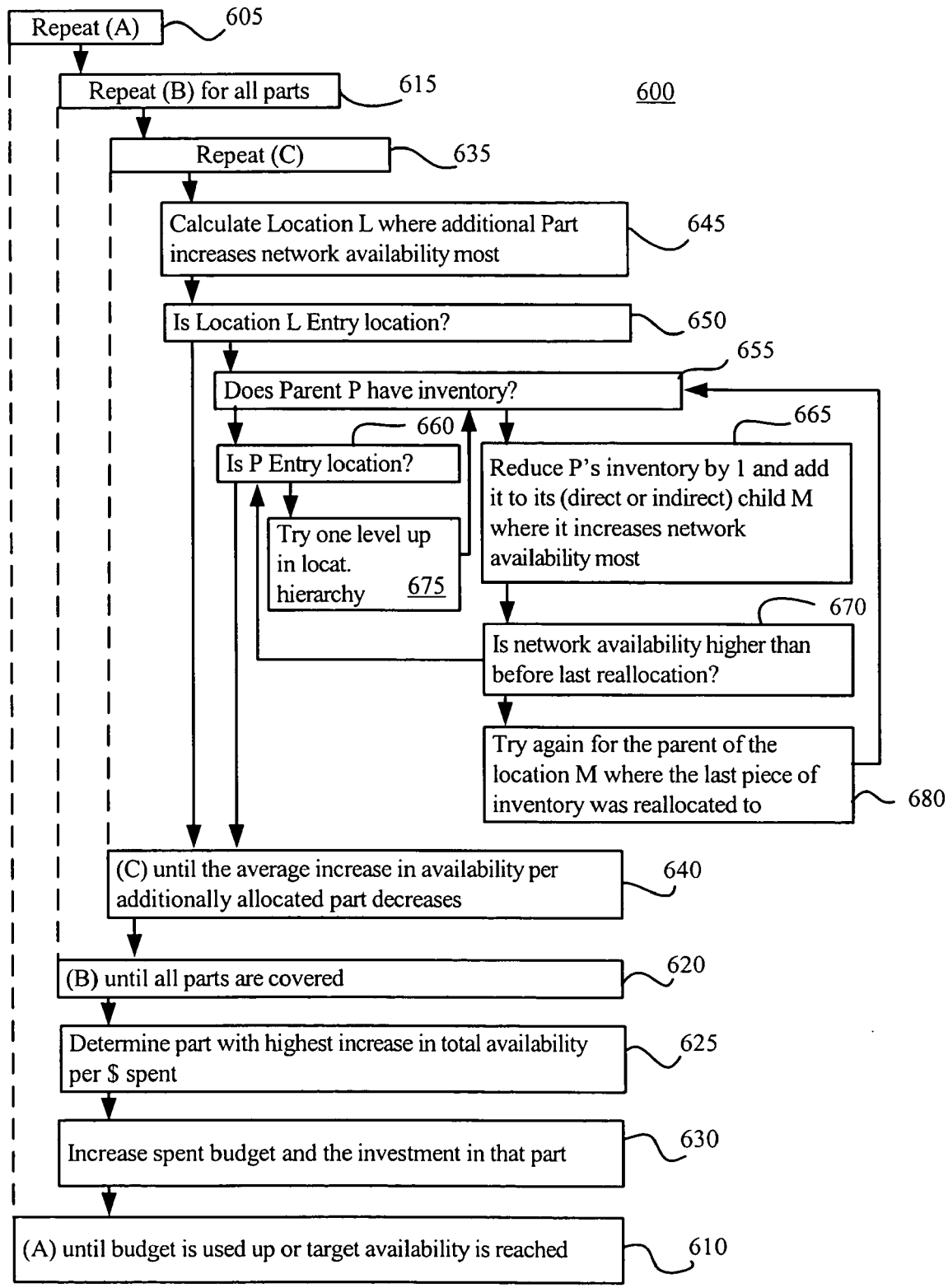
FIG. 6 is a flow diagram illustrating certain aspects of a method for service parts planning that checks for violations of incremental optimal allocation and violations of convexity, according to an embodiment of the invention.

FIG. 6 is a flow diagram illustrating certain aspects of a method for service parts planning that checks for violations of incremental optimal allocation and violations of convexity, according to an embodiment of the invention. Process blocks 605 and 610 form loop A of procedure 600. Similarly, process blocks 615 and 620 form loop B of procedure 600. Loop B cycles through each service part within a service parts pool and determines the gain in system availability per item cost for each service part. Referring to process block 625, the procedure determines the service part that currently provides the greatest gain in system availability per item cost. The budget expended for that service part is increased at 630. Loop A repeats the procedure until the budget is expended or a target availability is reached.

Referring to process block 645, procedure 600 calculates, for each service part, which location within a network provides the greatest gain in system availability per item cost. In an embodiment, this calculation is based, at least in part, on marginal analysis (e.g., as illustrated in FIG. 3). In certain cases, obtaining the greatest gain in system availability per item cost involves the combination of (1) increasing the inventory at a location and (2) reallocating a service part (or parts) among two or more locations (e.g., from a parent location to a child location). The phrase "checking for violations of optimal allocation" refers to determining whether obtaining the greatest gain includes reallocating a service part (or parts) among two or more locations. In an embodiment, procedure 600 provides checking for violations of optimal allocation. In the illustrated embodiment, these checks are implemented by process blocks 650-680. The procedure implemented in process blocks 650-680 is substantially similar to the procedure described with reference to FIG. 4. In an alternative embodiment, checking for violations of optimal allocation may include more process elements, fewer process elements, and/or different process elements.

In certain cases, obtaining the greatest gain in system availability per item cost involves checking for violations of convexity (e.g., as described above with reference to FIG. 5). In an embodiment, checking for violations of convexity includes determining whether the gain in system availability per item cost is greater when more than one instance of a service part is allocated to a location. For example, allocating a first instance of a service part may provide a gain of two percent in system availability per dollar spent on the service part. Allocating a second instance of the service part, however, may provide a gain of ten percent in system availability per dollar spent. In such cases, it may be preferable to allocate two instances of the service part to the location to achieve the greatest gain in service availability per item cost.

In the illustrated embodiment, a check for violations of convexity is performed at process block 640. In an embodiment, checking for violations of convexity includes repeating loop C until the average increase in system availability per additionally allocated service part decreases. In one embodiment these checks are substantially similar to the checks described above with reference to FIG. 5. In an alternative embodiment, checking for violations of convexity may include more process elements, fewer process elements, and/or different process elements than those illustrated in FIG. 5.

Figure 7:
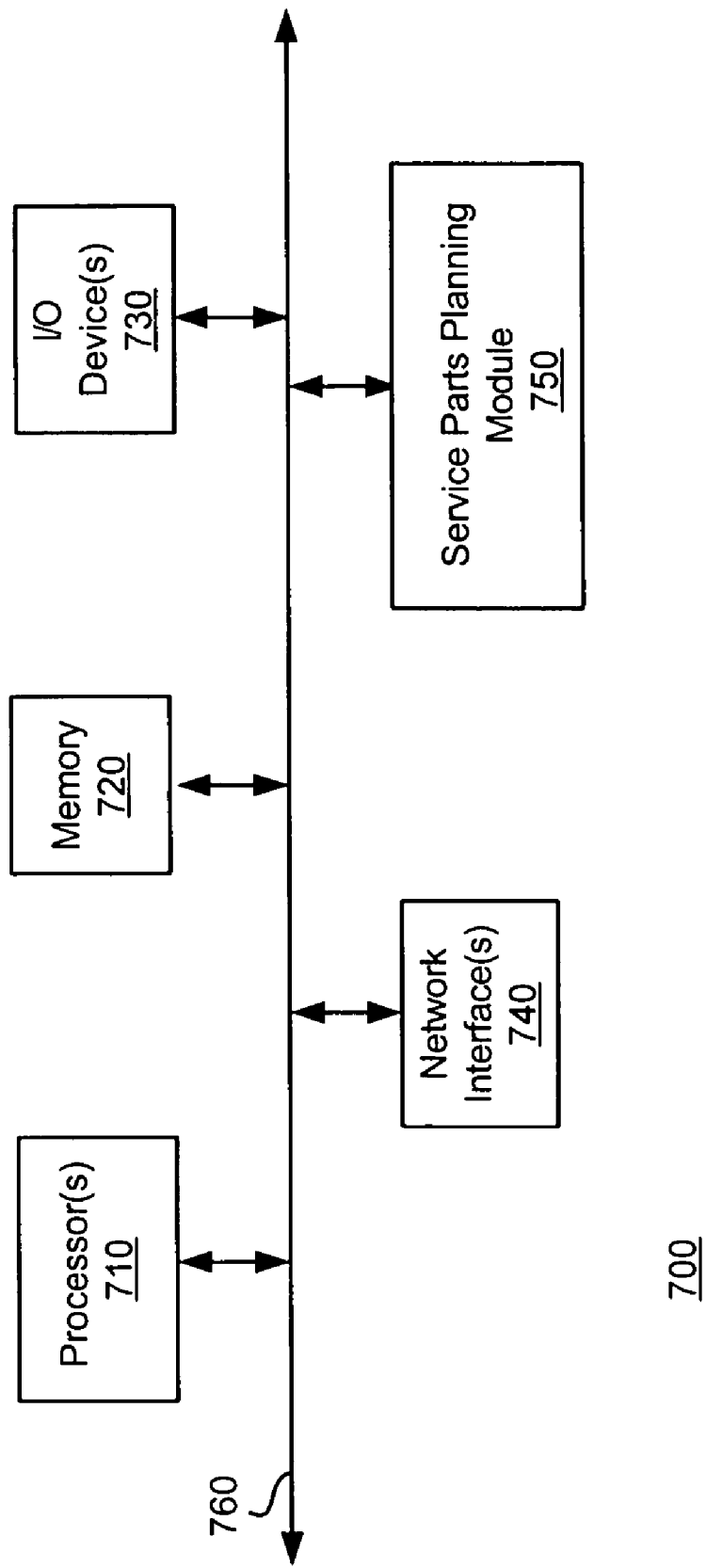
FIG. 7 is a block diagram of a computing system implemented according to an embodiment of the invention.

FIG. 7 is a block diagram of computing system 700 implemented according to an embodiment of the invention. Computing system 700 may include: processor(s) 710, memory 720, one or more Input/Output devices 730, network interface(s) 740, and service parts planning module 750. The illustrated elements may be connected together through system interconnection 760. Processor(s) 710 may include a microprocessor, microcontroller, field programmable gate array (FPGA), application specific integrated circuit (ASIC), central processing unit (CPU), programmable logic device (PLD), and similar devices that access instructions from system storage (e.g., memory 720), decode them, and execute those instructions by performing arithmetic and logical operations.

Service parts planning module 750 may enable computing system 700 to determine a service parts distribution in a multipart multi-echelon network. Service parts planning module 750 may be executable content, control logic (e.g., ASIC, PLD, FPGA, etc.), firmware, or some combination thereof, in an embodiment of the invention. In embodiments of the invention in which service parts planning module 750 is executable content, it may be stored in memory 720 and executed by processor(s) 710.

In an embodiment, service parts planning module 750 is part of a multi-tiered network. The multi-tiered network may be implemented using a variety of different application technologies at each of the layers of the multi-tier architecture, including those based on the Java 2 Enterprise Edition™ ("J2EE") platform, the Microsoft .NET platform, the Websphere platform developed by IBM Corporation, and/or the Advanced Business Application Programming ("ABAP") platform developed by SAP AG.

Memory 720 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 720 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 720 may store program modules such as routines, programs, objects, images, data structures, program data, and other program modules that perform particular tasks or implement particular abstract data types that facilitate system use.

One or more I/O devices 730 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnection 760 permits communication between the various elements of computing system 700. System interconnection 760 may include a wide variety of signal lines including one or more of a memory bus, peripheral bus, local bus, host bus, bridge, optical, electrical, acoustical, and other propagated signal lines.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. An apparatus comprising:
   a memory to store a data structure representing a multi-echelon network having one or more service parts; and
   a processor and logic executable thereon to, for each of at least a subset of the one or more service parts,
      calculate, for the service part, a location within the multi-echelon network, for which allocating the service part to the location provides a greatest gain in system availability per item cost, wherein system availability defines a probability that the multi-echelon network is functioning;
      wherein system availability is given by $$A(S_{i,j}) = \frac{\sum_{j=1}^{J} A_j(S_{i,j})}{J},$$

and further wherein $S_{i,j}$ is the inventory position for part i at location j, $A_j(S_{i,j})$ is the system availability at location j, J is the number of demand facing locations, and $A(S_{i,j})$ is the system availability across all locations in the multi-echelon network,
      allocate an additional instance of the service part to the location,
      recalculate the gain in system availability per item cost based, at least in part, on the additional instance of the service part allocated to the location, and
      repeat the process of allocating an additional instance of the service part to the location and recalculating the gain in system availability per item cost until an average gain in system availability per item cost decreases.

2. The apparatus of claim 1, wherein the logic executable thereon to calculate, for the service part, the location within the multi-echelon network, for which allocating the service part to the location provides the greatest gain in system availability per item cost further comprises logic to:
   determine whether the location is an entry location;
   determine whether a parent location of the location has one or more instances of the service part, if the location is not an entry location; and
   reallocate an instance of the service part to a child location of the parent location.

3. The apparatus of claim 2, wherein the parent location is associated with one or more child locations and the logic executable thereon to reallocate the instance of the service part to the child location of the parent location further comprises logic to:
   calculate, for which of the one or more child locations, allocating the service part to the child location provides a greatest gain in system availability per item cost; and
   reallocate the instance of the service part to the child location providing the greatest gain in system availability per item cost.

4. The apparatus of claim 2, wherein the logic executable thereon further comprises logic to:
   determine whether a gain in system availability per item cost is greater subsequent to reallocating the service part to the child location of the parent location; and
   repeat the process of determining whether the parent location of the location has one or more instances of the service part and reallocating an instance of the service part, if the gain in system availability per item cost is greater subsequent to reallocating the instance of the service part.

5. A method for service parts planning in a multi-echelon network having one or more service parts comprising:
   for each of at least a subset of the one or more service parts,
      calculating, for the service part, a location within the multi-echelon network, for which allocating the service part to the location provides a greatest gain in system availability per item cost, wherein system availability defines a probability that the multi-echelon network is functioning;
      wherein system availability is given by $$A(S_{i,j}) = \frac{\sum_{j=1}^{J} A_j(S_{i,j})}{J},$$

and further wherein $S_{i,j}$ is the inventory position for part i at location j, $A_j(S_{i,j})$ is the system availability at location j, J is the number of demand facing locations, and $A(S_{i,j})$ is the system availability across all locations in the multi-echelon network,
      allocating an additional instance of the service part to the location;
      recalculating the gain in system availability per item cost based, at least in part, on the additional instance of the service part allocated to the location; and
      repeating the process of allocating an additional instance of the service part to the location and recalculating the gain in system availability per item cost until an average gain in system availability per item cost decreases.

6. The method of claim 5, wherein calculating, for the service part, the location within the multi-echelon network, for which allocating the service part to the location provides the greatest gain in system availability per item cost further comprises:
   determining whether the location is an entry location;
   determining whether a parent location of the location has one or more instances of the service part, if the location is not an entry location; and
   reallocating an instance of the service part to a child location of the parent location.

7. The method of claim 6, wherein the parent location is associated with one or more child locations and reallocating the instance of the service part to the child location of the parent location further comprises:
   calculating, for which of the one or more child locations, allocating the service part to the child location provides a greatest gain in system availability per item cost; and
   reallocating the instance of the service part to the child location providing the greatest gain in system availability per item cost.

8. The method of claim 6, further comprising:
   determining whether a gain in system availability per item cost is greater subsequent to reallocating the service part to the child location of the parent location; and
   repeating the process of determining whether the parent location of the location has one or more instances of the service part and reallocating an instance of the service part, if the gain in system availability per item cost is greater subsequent to reallocating the instance of the service part.

9. The method of claim 8, further comprising:
  determining whether the parent location is an entry location, if the gain in system availability per item cost is not greater subsequent to reallocating the instance of the service part;
  determining whether a next higher parent location has one or more instances of the service part, if the parent location is not an entry location; and
  reallocating an instance of the service part to a child location of the next higher parent location.

10. The method of claim 5, further comprising:
  determining a service part providing a greatest gain in system availability per item cost; and
  increasing an investment in the service part providing the greatest gain in system availability per item cost.

11. The method of claim 10, further comprising:
  repeating the process until one of,
    a target budget is expended; and
    a target system availability is achieved.

12. The method of claim 5, wherein calculating, for the service part, the location within the multi-echelon network, for which allocating the service part to the location provides the greatest gain in system availability per item cost comprises:
  calculating the location within the multi-echelon network, for which allocating the service part to the location provides the greatest gain in system availability per item cost based, at least in part, on marginal analysis.

13. An article of manufacture for service parts planning in a multi-echelon network having one or more service parts, the article of manufacture comprising an electronically accessible medium providing instructions that, when executed by an apparatus, cause the apparatus to:
  for each of at least a subset of the one or more service parts,
    calculate, for the service part, a location within the multi-echelon network, for which allocating the service part to the location provides a greatest gain in system availability per item cost, wherein system availability defines a probability that the multi-echelon network is functioning;
    wherein system availability is given by $$A(S_{i,j}) = \frac{\sum_{j=1}^{J} A_j(S_{i,j})}{J}$$

and further wherein $S_{i,j}$ is the inventory position for part i at location j, $A_j(S_{i,j})$ is the system availability at location j, J is the number of demand facing locations, and $A(S_{i,j})$ is the system availability across all locations in the multi-echelon network,
    allocate an additional instance of the service part to the location;
    recalculate the gain in system availability per item cost based, at least in part, on the additional instance of the service part allocated to location; and
    repeat the process of allocating an additional instance of the service part to the location and recalculating the gain in system availability per item cost until an average gain in system availability per item cost decreases.

14. The article of manufacture of claim 13, wherein the instructions that, when executed by the apparatus, cause the apparatus to calculate, for the service part, the location within the multi-echelon network, for which allocating the service part to the location provides the greatest gain in system availability per item cost further, cause the apparatus to:
  determine whether the location is an entry location;
  determine whether a parent location of the location has one or more instances of the service part, if the location is not an entry location; and
  reallocate an instance of the service part to a child location of the parent location.

15. The article of manufacture of claim 14, wherein the parent location is associated with one or more child locations and the instructions that, when executed by the apparatus, cause the apparatus to reallocate the instance of the service part to the child location of the parent location further cause the apparatus to:
  calculate, for which of the one or more child locations, allocating the service part to the child location provides a greatest gain in system availability per item cost; and
  reallocate the instance of the service part to the child location providing the greatest gain in system availability per item cost.

16. The article of manufacture of claim 14, wherein the electronically accessible medium provides further instructions that, when executed by the apparatus, cause the apparatus to:
  determine whether a gain in system availability per item cost is greater subsequent to reallocating the service part to the child location of the parent location; and
  repeat the process of determining whether the parent location of the location has one or more instances of the service part and reallocating an instance of the service part, if the gain in system availability per item cost is greater subsequent to reallocating the instance of the service part.

17. The article of manufacture of claim 16, wherein the electronically accessible medium provides further instructions that, when executed by the apparatus, cause the apparatus to:
  determine whether the parent location is an entry location, if the gain in system availability per item cost is not greater subsequent to reallocating the instance of the service part;
  determine whether a next higher parent location has one or more instances of the service part, if the parent location is not an entry location; and
  reallocate an instance of the service part to a child location of the next higher parent location.

18. The article of manufacture of claim 13, wherein the electronically accessible medium provides further instructions that, when executed by the apparatus, cause the apparatus to:
  determine a service part providing a greatest gain in system availability per item cost; and
  increase an investment in the service part providing the greatest gain in system availability per item cost.

19. The article of manufacture of claim 18, wherein the electronically accessible medium provides further instructions that, when executed by the apparatus, cause the apparatus to:
  repeat the process until one of,
    a target budget is expended; and
    a target system availability is achieved.

20. The article of manufacture of claim 13, wherein the instructions that, when executed by the apparatus, cause the apparatus to calculate, for the service part, the location within the multi-echelon network, for which allocating the service part to the location provides the greatest gain in system availability per item cost cause the apparatus to:

calculate the location within the multi-echelon network, for which allocating the service part to the location provides the greatest gain in system availability per item cost based, at least in part, on marginal analysis.

* * * * *